May 21, 1935.  G. H. CRANE  2,002,286
BRAKE ADJUSTING GAUGE
Filed July 21, 1934
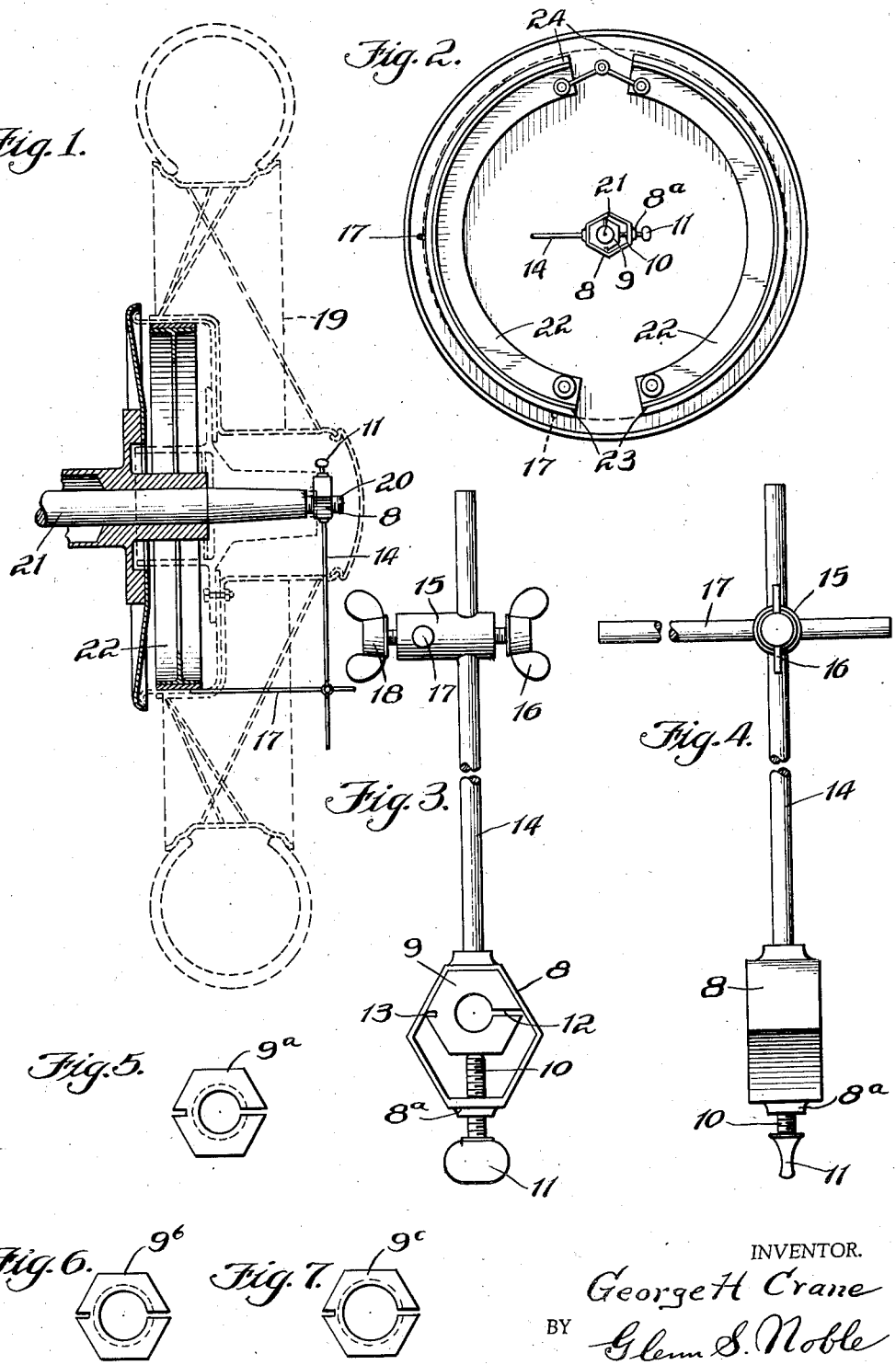
INVENTOR.
George H Crane
BY Glenn S. Noble
ATTORNEY.

Patented May 21, 1935

2,002,286

UNITED STATES PATENT OFFICE 2,002,286

BRAKE ADJUSTING GAUGE

George H. Crane, Muskegon, Mich.

Application July 21, 1934, Serial No. 736,319

6 Claims. (Cl. 33—180)

The efficiency of vehicle brakes is in a large measure dependent upon the accuracy of the setting of the brake shoes. For instance, if the brake shoes are set so that only one end or a portion of the brake makes contact with the brake drum when applied, the braking effect will be greatly reduced. The ideal condition is to have substantially the entire length of the brake shoes make contact with the brake drums when applied but inasmuch as the shoes of brakes of the internal expanding type are enclosed in the drums it has been found difficult to properly adjust the same. The present invention relates to a tool particularly intended for accurately adjusting such brake shoes.

The objects of this invention are to provide an improved tool for the purposes above indicated; to provide such a tool or device which may be cheaply manufactured and which will be efficient, accurate and durable in use; to provide a brake adjusting gauge which may be readily applied to different styles or makes of automobiles or vehicles; to provide novel means for rotatively mounting the gauge on a threaded axle; and to provide such other advantages and improvements as will appear more fully hereinafter.

In the accompanying drawing illustrating this invention,

Figure 1 is a sectional view of an automobile wheel showing my improved gauge mounted on the axle;

Figure 2 is an end view illustrating the use of the gauge;

Figure 3 is an enlarged front view of the gauge;

Figure 4 is a side view of the same; and

Figures 5, 6 and 7 show different sizes of threaded bushings or pivotal members to be applied to different sized axles.

The particular form of my improved gauge as shown in the drawing has a ring or loop 8 which is preferably hexagonal in shape and which encloses or is engaged by the hexagonal bushing 9 which fits closely in one side thereof. The bushing 9 is threaded to engage with the threaded end of the automobile axle. This bushing is held in position by a set screw 10 which extends through a threaded boss 8a on one side of the ring or collar 8 and has a thumb portion 11 for convenience in tightening the same. In order that the bushing may be fitted closely to the threaded end of the axle, it is split as shown at 12 and may also be weakened by being notched or grooved as shown at 13 so that it may be compressed or contracted by the thumb screw to adjust it closely to the threads. It will be understood that this threaded bushing is to revolve on the threads and it is preferably adjusted so that it may be turned without loss of motion or play.

The loop or ring 8 has a radially extending rod 14 which is secured therein in any desired manner. The slide or block 15 is adjustably mounted on the rod 14 and is held in adjusted position by a set screw or thumb screw 16. Another rod or finger 17 extends through a hole in the slide 15 and is held in adjusted position by a set screw 18. The rod or finger 17 is at substantially right angles to the rod 14.

When the gauge is to be used for testing new or old brakes, the wheel 19 as indicated in dotted lines in Figure 1, is removed and the gauge is applied to the threaded end 20 of the axle 21. The threaded bushing is adjusted so that there will be no lost motion and the gauge will describe a perfect arc or circle with the axis of the axle as the center. The finger or rod 17 is then adjusted radially and also longitudinally to bring the inner end adjacent to the outer surfaces of the brake shoes 22. Then by rotating the gauge the positions of the surfaces of the drums with respect to the axle may be readily noted.

When the brakes are to be set, one portion of one of the shoes as for instance the pivoted or heel portion as indicated at 23, is adjusted before the brake drum is removed, until it makes contact with the inner surface of the drum. This would then serve as a measure of the inner diameter of the drum. The finger 17 may then be brought into contact with such portion of the brake shoe as indicated in Figure 2 and then by rotating the gauge on the axle the proper positions for the different portions of the brake shoes may be determined and if more clearance is desired, for instance at the free or toe end 24, and at the heel or pivoted end 23, a feeler gauge may be used in adjusting the free end of the brake shoe to its proper position, such gauge being inserted between the rod or finger 17 and the adjacent surface of the brake. After the brakes have been properly adjusted the gauge is removed and when the brake drum is again placed in position it will be known that the shoes are properly adjusted to produce the most efficient braking action.

In order that the gauge may be used for axles of different sizes I provide a number of threaded bushings 9a, 9b and 9c as shown in Figures 5, 6 and 7, all having the same outer dimensions but with different sized threaded holes therethrough.

By means of this arrangement one size gauge may be utilized for a large variety of cars.

While I have shown a preferred form of my invention, which has proven efficient in actual use, it may be noted that changes may be made in the details of construction or arrangement of the parts in order to adapt the same for different conditions or vehicles and therefore I do not wish to be limited to the particular construction shown and described except as set forth in the following claims, in which I claim:

1. A brake adjusting gauge comprising a ring, a split threaded bushing mounted in said ring, a thumb screw holding the bushing in position and for adjusting the same, a rod extending outwardly from the ring, a slide mounted on said rod, a thumb screw for holding the slide in adjusted position, a finger slidably mounted in the slide at substantially right angles to the rod, and a thumb screw for holding the finger in adjusted position.

2. In a brake adjusting gauge, the combination of a collar having a hexagonal opening therein, a split hexagonal bushing adapted to fit in one side of the collar, a thumb screw extending through the collar and engaging with the bushing and serving to hold and adjust the same, a rod secured to the collar and projecting from the side opposite to the thumb screw, a slide mounted on said rod, means for securing the slide in adjusted position, a second rod slidably mounted in the slide and arranged at an angle to the first named rod, and means for holding the second named rod in adjusted position, said second named rod being adapted to be brought into close proximity with the brake shoes when the gauge is mounted on the axle.

3. In a device of the character set forth, the combination of a collar, a threaded bushing mounted in said collar, said bushing being split longitudinally on one side and notched on the opposite side to facilitate compression of the same, means for holding the bushing in the collar, means for compressing the bushing to tighten the same on a threaded portion of an axle, a rod secured to the collar, a block adjustably mounted on said rod and a finger adjustably mounted in the block and arranged at substantially right angles to the rod.

4. A brake adjusting gauge comprising a band or collar, a plurality of split threaded bushings having different sized openings and adapted to engage one at a time with the collar for use on different sized axles, the walls of said bushings being notched at a distance from the splits so that they may be readily adjusted, means for securing the bushings in the collar and also for adjusting the same, a rod extending outwardly from the collar, a slide adjustably mounted on the rod, and a finger adjustably mounted in said slide and adapted to be rotated around the brake shoes for the purposes described.

5. A device of the character set forth, comprising a threaded split bushing for engagement with the threaded portion of a vehicle axle, a collar embracing said bushing, means for securing the collar to the bushing and adjusting the bushing to the axle whereby the collar may be rotated around the axle without play, a rod extending outwardly from the collar, and a finger adjustably mounted on the rod and adapted to be rotated around the brake shoes for indicating the positions of the same.

6. A gauge for adjusting vehicle brakes, comprising a split contractible bushing member for engagement with the threaded portion of the vehicle axle a collar member enclosing said bushing member, means coacting with said collar member for adjusting said bushing member to cause it to engage closely with the threads to prevent radial movement but permitting free rotation thereof, an arm extending outwardly from the collar member and means associated with the arm for engagement with the brake surfaces to indicate the proper positions thereof.

GEORGE H. CRANE.